United States Patent
Enos et al.

(10) Patent No.: US 10,781,504 B2
(45) Date of Patent: Sep. 22, 2020

(54) METHOD FOR THE TREATMENT OF METALLIC PARTICLES AND OBJECTS CONTAMINATED WITH METALLIC PARTICLES

(71) Applicant: MT2, LLC, Arvada, CO (US)

(72) Inventors: Michael L. Enos, Colorado Springs, CO (US); James M. Barthel, Golden, CO (US); Trevor C. Schwaab, Arvada, CO (US)

(73) Assignee: MT2, LLC, Arvada, CO (US)

( * ) Notice: Subject to any disclaimer, the term of this patent is extended or adjusted under 35 U.S.C. 154(b) by 166 days.

(21) Appl. No.: 15/487,074

(22) Filed: Apr. 13, 2017

(65) Prior Publication Data

US 2018/0037973 A1    Feb. 8, 2018

Related U.S. Application Data

(60) Provisional application No. 62/372,204, filed on Aug. 8, 2016.

(51) Int. Cl.
  *C22B 3/00* (2006.01)
  *C22B 1/242* (2006.01)
  (Continued)

(52) U.S. Cl.
  CPC .............. *C22B 13/045* (2013.01); *A62D 3/33* (2013.01); *B09B 3/0025* (2013.01); *B09B 3/0033* (2013.01); *B09B 3/0041* (2013.01); *C22B 1/242* (2013.01); *C22B 1/243* (2013.01); *C22B 1/244* (2013.01); *C22B 1/248* (2013.01); *C22B 7/00* (2013.01); *C22B 7/006* (2013.01); *C22B 13/025* (2013.01); *C22B 15/00* (2013.01);
  (Continued)

(58) Field of Classification Search
  CPC ... C22B 1/242–244; C22B 1/248; C22B 7/00; C22B 7/006; C22B 13/0045; C22B 13/025; A62D 3/33; A62D 2101/06; A62D 2101/43; B09B 3/0025; B09B 3/0033; B09B 3/0041
  See application file for complete search history.

(56) References Cited

U.S. PATENT DOCUMENTS 3,307,927 A * 3/1967 Muschenborn ........... C22B 1/24
                                                       75/766
3,664,824 A * 5/1972 Meadus .................. F42B 7/046
                                                       102/501

(Continued)

OTHER PUBLICATIONS

"Indoor Firing Ranges INdustrial Hygiene Technical Guide"; US Dept. of Navy, Navy Enfironmental Health Center; Technical Manual NEHC-TM6290.99-10 Rev. 1; May 2002; 58 pp.

(Continued)

*Primary Examiner* — Tima M. McGuthry-Banks
(74) *Attorney, Agent, or Firm* — David F. Dockery; The Navitas Intellectual Property Group LLC

(57) ABSTRACT

Methods for the treatment of metallic particles such as heavy metal particles and objects contaminated with the metallic particles. For the treatment of objects contaminated with the metallic particles, a stabilizing composition may be applied to the object with or without a fixation agent. For the treatment of free-flowing metallic particles, an agglomeration agent may be used with or without a stabilizing agent.

32 Claims, 5 Drawing Sheets

(51) Int. Cl.

| | | |
|---|---|---|
| *C22B 1/248* | (2006.01) | |
| *C22B 7/00* | (2006.01) | |
| *B09B 3/00* | (2006.01) | |
| *C22B 13/02* | (2006.01) | |
| *C22B 1/244* | (2006.01) | |
| *C22B 1/243* | (2006.01) | |
| *C22B 15/00* | (2006.01) | |
| *A62D 3/33* | (2007.01) | |
| *A62D 101/06* | (2007.01) | |
| *A62D 101/43* | (2007.01) | |

(52) U.S. Cl.
CPC ...... *A62D 2101/06* (2013.01); *A62D 2101/43* (2013.01); *B09B 2220/08* (2013.01); *Y02P 10/214* (2015.11)

(56) References Cited

U.S. PATENT DOCUMENTS

| | | | | | |
|---|---|---|---|---|---|
| 3,857,743 | A | * | 12/1974 | Allan | C06B 23/001 149/20 |
| 3,987,730 | A | * | 10/1976 | Meadus | B22F 9/04 102/517 |
| 4,734,237 | A | * | 3/1988 | Fanelli | B22F 3/22 264/109 |
| 5,000,783 | A | * | 3/1991 | Dingeman | C22B 1/244 75/321 |
| 5,116,415 | A | * | 5/1992 | Rinehart | B01D 15/00 423/25 |
| 5,722,928 | A | | 3/1998 | Forrester | |
| 5,797,992 | A | | 8/1998 | Huff | |
| 6,001,185 | A | | 12/1999 | Huff | |
| 6,688,811 | B2 | | 2/2004 | Forrester | |
| 2002/0115899 | A1 | | 8/2002 | Stanforth | |
| 2003/0143031 | A1 | * | 7/2003 | Forrester | A62D 3/33 405/129.25 |
| 2003/0150360 | A1 | | 8/2003 | Huntsman et al. | |
| 2003/0188663 | A1 | | 10/2003 | Barthel et al. | |
| 2004/0127620 | A1 | | 7/2004 | Barthel et al. | |
| 2005/0209497 | A1 | * | 9/2005 | Forrester | B09B 3/0025 588/252 |
| 2005/0220686 | A1 | * | 10/2005 | Hurley | A62D 3/33 423/92 |
| 2006/0027129 | A1 | * | 2/2006 | Kolb | F42B 12/74 102/517 |
| 2006/0140725 | A1 | | 6/2006 | Benjamin et al. | |
| 2008/0000379 | A1 | * | 1/2008 | Hansen | F42B 7/046 102/517 |
| 2008/0207980 | A1 | | 8/2008 | Forrester | |
| 2011/0116872 | A1 | | 5/2011 | Cunigan | |

OTHER PUBLICATIONS

Cao et al.; Immobilization of Lead in Shooting Range Soils by Means of Cement, Quicklime, and Phosphate Amendments; Env. Sci. Pollut. Res. 15(2); Spring 2008; pp. 120-127.
International Search Report and Written Opinion dated Oct. 18, 2017 for International Patent Application No. PCT/US2017/044824.
Office Action dated Sep. 21, 2017 for U.S. Appl. No. 15/597,493.
Office Action dated Apr. 19, 2018 for U.S. Appl. No. 15/597,493.
Office Action dated Sep. 21, 2017 for U.S. Appl. No. 15/642,103.
Final Office Action dated Jul. 13, 2018 for U.S. Appl. No. 15/642,103.
McGowen et al.; "Use of Diammonium Phosphate to Reduce Heavy Metal Solubility and Transport in Smelter-Contaminated Soil"; Journal of Environmental Quality; Mar. 2001; 9 pgs.

* cited by examiner

METHOD FOR THE TREATMENT OF METALLIC PARTICLES AND OBJECTS CONTAMINATED WITH METALLIC PARTICLES

CROSS-REFERENCE TO RELATED APPLICATIONS

This application claims the priority benefit under 35 USC § 119(e) of U.S. Provisional Patent Application No. 62/372,204 filed on Aug. 8, 2016, the disclosure of which is incorporated herein by reference in its entirety.

FIELD

This disclosure relates to the field of treatments for objects that are contaminated with metallic particles, particularly for the treatment of objects that are contaminated with heavy metal particles such as lead particles, and for the treatment of free-flowing metallic particles, such as free-flowing metallic lead particles.

BACKGROUND

Heavy metals such as lead (Pb) are toxic to both humans and to the overall ecosystem. Lead and other metals become increasingly toxic and hazardous with an increase in concentration and with a decrease in particle size, making them more available for human ingestion and more susceptible to airborne dissemination. There are numerous facilities that generate high concentrations and/or small particles of metals. Virtually any metal that is in such a form (e.g., of small metallic particles) may be hazardous to people in the vicinity of the metal, including non-heavy metals such as copper (Cu). Particularly hazardous are those metals that are heavily regulated due to their toxicity, such as arsenic (As), barium (Ba), cadmium (Cd), chromium (Cr), lead (Pb), mercury (Hg), selenium (Se) and silver (Ag). Any of the foregoing particles may be generated at recycling facilities including, but not limited to metal recycling facilities, battery recycling facilities, and cathode ray tube (CRT) recycling facilities that generate lead-containing glass particles. Other sources for such contaminant metallic particles may include, but are not limited to, manufacturing facilities for ammunition, lead-acid batteries, ballast keels of sailboats, scuba diving weights, stained-glass, architectural metals, electrodes, radiation vests, ceramic glazes, PVC plastic for coding electrical cords, leaded glass, lead solder, semiconductors and power generation from coal or from waste materials. One particular source of such contamination are firing ranges, particularly indoor firing ranges.

The metallic particles generated by such facilities may have a wide particle size range, such as from nanometer-sized particles to millimeter-sized particles. Within this broad particle size range, particles that become easily airborne, e.g., having a particle size of not greater than about 500 µm, may be particularly hazardous. Objects (e.g., materials, components, etc. . . . ) that are contaminated with such metallic particles present a challenge with respect to the safe management, treatment and/or collection of the objects, e.g., to pass relevant waste regulations, to transport the articles in compliance with Department of Transportation (DOT) regulations, to meet applicable waste disposal requirements and regulations, and/or to enable recycling of the metal(s).

Prior environmental technologies for treating lead compounds and other metal compounds do not provide a viable and cost effective solution when addressing the high metallic concentrations and/or fine particle sizes of metallic particles generated by many of the above-noted industries, such as firing ranges. Prior technologies for treating metals, particularly heavy metal compounds such as lead compounds, involve the treatment of waste streams containing metallic concentrations of typically much less than 50 wt. %, and more typically metallic concentrations of 10 wt. % (100,000 ppm) or much less. In these situations, the metals are typically comingled with soil, sand or other solid waste. In addition, most of the metallic contamination is either from lead compound particles (e.g., particulates and/or fragments) or dissolved lead (or other metals) with minimal concentrations of metallic particles (e.g., much less than 10 wt. %). As such, prior technologies are particularly ineffective for the treatment of highly concentrated metallic particles (e.g., lead particles) to meet or exceed established environmental and waste regulations, such as the requirements of the Resource Conservation and Recovery Act (RCRA) in the United States. With regard to lead-bearing particles from old lead paint, it is reported by the United States Environmental Protection Agency (EPA) that a small packet of lead particles the size of a tea bag is capable of contaminating an entire room to levels that would be dangerous to human inhalation. The lead particle quantities to be managed from firing ranges and other sources of metallic particles are substantially greater in volume than a tea bag. As an example, a typical HEPA ("high-efficiency particulate arrestance") filter recovered from an indoor firing range may hold as much as 50 pounds of metallic lead particles—enough to fill a one-gallon container. Typically, there are multiple pre-filters and often secondary filters or HEPA filters inline after the pre-filters for each firing range that require periodic removal, replacement and disposal of the lead contaminated filters. Current technology involving the simple application of phosphates for treating environmental lead contamination may not effectively treat the 50% pure metallic lead and/or metallic copper particles (e.g., greater than 50% metal, or even greater than 80% metal or greater than 90% metal) that are found, for example, at indoor firing ranges. Current technology may not adequately treat such a high concentration of metallic particles to reduce airborne spread and to reduce workforce exposure issues in compliance with United States OSHA (Occupational Safety and Health Administration) workplace requirements for metallic lead and particulate exposure. In addition to the inhalation/ingestion hazards of the metallic lead particles and other metallic particles, it is commonly known that airborne metal particles are highly flammable and potentially explosive at relatively low levels of airborne dust concentrations. There is a need for a technology that cost effectively reduces the potential for dispersion and/or combustion of the metal particles to support safe and regulatory compliant transport for recycle or disposal.

Firing ranges, during routine operations, generate metallic lead particles, and may also generate metallic copper particles from the bullet coatings as well as from copper and other metallic pressed frangible (non-Pb) bullets and shot. Firing range waste includes not only metallic lead particles accumulated in air filters (HEPA/Non-HEPA), but also metallic lead particles accumulated in bullet trap collection systems and materials such as crumb (e.g., granulated) rubber particles, sound insulation and other ceiling/wall boards and target system wastes. These accumulation points at indoor firing ranges can contain high concentrations of metallic lead and copper particulates.

SUMMARY

New technology is needed for the treatment of objects that are contaminated with metallic particles, particularly metallic lead particles. In particular, new technologies are needed for the treatment of objects that are highly contaminated with such metallic particles, such as objects that are retrieved from firing ranges, e.g., filters and the like.

In addition to the treatment of contaminated objects, new technology is needed to treat the metallic particles that converts the particles into larger agglomerated masses that meet stringent non-hazardous waste and transportation requirements (e.g., through the US Department of Transportation—"DOT") or provides for a safe means of recycle through smelting. New technology is needed that provides for effective means of adhering the treatment reagents to the various surface types including accessing the extensive surface area of the particles or in treating particles contained in materials such as HEPA filters, e.g., with a 3-dimensional surface area.

In one embodiment, a method for the treatment of an object that is contaminated with metallic particles of a heavy metal deposited on a surface of the object is disclosed. The method includes the step of applying a stabilizing composition to the object, where the stabilizing composition comprises a liquid carrier and a heavy metal stabilizing agent. In various characterizations, the object may be an object that is recovered from a firing range, e.g., an indoor firing range where handheld guns and/or rifles are fired at a target. Such objects may include, for example, filters from an air filtration system or from rubber (e.g., granulated rubber) that is used to arrest the bullets fired toward a target. Such objects may include metallic lead particles as well as metallic copper particles. The method may also include the use of a fixation agent to assist in the adherence of the stabilizing composition to the object, and/or to assist wetting of the metallic particles by the stabilizing composition.

In another embodiment, method for the stabilization of substantially free-flowing particles including a heavy metal, e.g., metallic particles, is disclosed. The method may include contacting the metallic particles with an agglomeration agent to substantially bind together at least a portion of the metallic particles and form at least a first metallic particle agglomerate and reduce the probability of the metallic particles being released to the atmosphere during handling and/or transportation of the metallic particles. The potential for the metallic particles to become airborne, and of increased danger to personnel exposed to the particles, becomes greatly reduced. Such metallic particles may be obtained from a firing range, as is described above, or from facilities such as those involved in the manufacture or manipulation (e.g., recycling) of batteries or recycling of cathode ray tube (CRT) glass.

DESCRIPTION OF THE EMBODIMENTS

Figure 1:
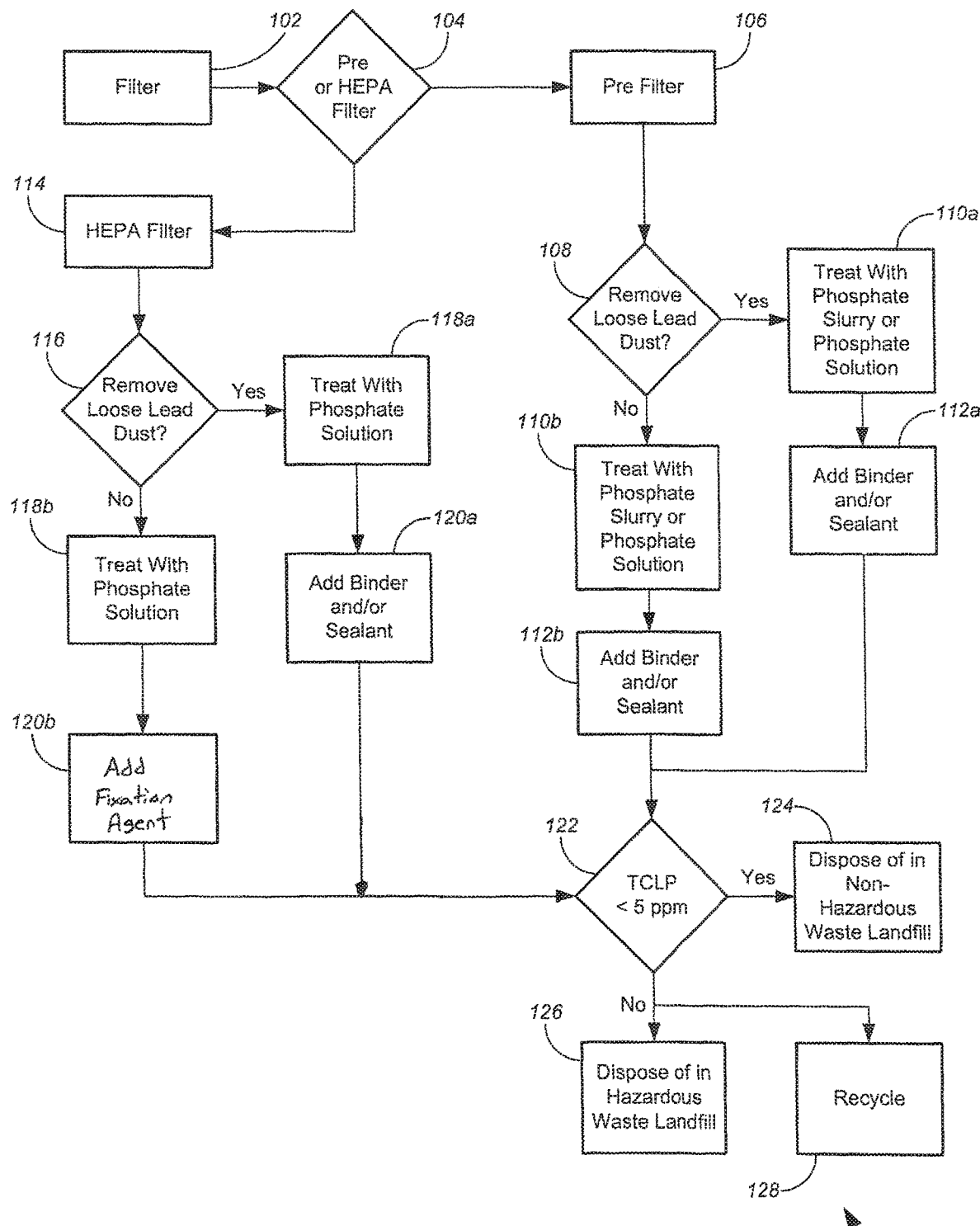
FIG. 1 is a flowsheet illustrating a process for the treatment of a filter that includes metallic lead particles according to an embodiment.

In one embodiment of this disclosure, a method for the treatment of an object is disclosed, where the object is contaminated with metallic particles of a heavy metal that are deposited on a surface of the object. The method includes the step of applying a stabilizing composition to the object, where the stabilizing composition includes at least a liquid carrier and a heavy metal stabilizing agent. In accordance with the embodiments described below, the heavy metal stabilizing agent may be solubilized in the liquid carrier (e.g., to form a solution), the heavy metal stabilizing agent may form a dispersion in the liquid carrier (e.g., to form a slurry), or one or more heavy metal stabilizing agents may be utilized to form both a solution and a slurry, e.g., particles of a heavy metal stabilizing agent dispersed in a solution of a heavy metal stabilizing agent. The most effective combination of liquid carrier and heavy metal stabilizing agent will largely depend upon the nature of the object that is being treated.

The methods described herein are particularly useful for the treatment of objects having metallic particles deposited in the object that present a hazard to the environment and/or to humans due to their toxicity, even at very low levels of contamination. By way of example, the methods may be used to treat objects contaminated with metallic lead particles, metallic copper particles, metallic arsenic particles, metallic barium particles, metallic cadmium particles, metallic chromium particles, metallic mercury particles, metallic selenium particles, metallic silver particles, metallic antimony particles, and combinations thereof. In certain characterizations, the metallic particles are selected from the group consisting of metallic lead particles, metallic copper particles, metallic arsenic particles, metallic antimony particles, and combinations thereof. In one more particular characterization, the metallic particles include of metallic lead particles. Metallic lead particles are often found in high quantities at facilities such as firing ranges, particularly on the filters, acoustic insulation, bullet traps, floor covering (e.g., carpeting) and other features utilized at firing ranges. In another example, the metallic particles comprise metallic copper particles and metallic lead particles, such as due to copper cladded bullets.

The methods disclosed herein may be utilized to treat objects that are contaminated with metallic particles having a wide range of particle size (e.g., particle diameter). The methods may be utilized to treat objects contaminated with metal particles having an average (e.g., D50 median) size in the nanometer-size range, e.g., about 1 nm or greater. The methods are also suitable for treating objects comprising particles in the micrometer particle size range, e.g., from about 0.1 μm to about 500 μm. Particles having a size of not greater than about 500 μm may be particularly susceptible to becoming airborne and creating a hazardous condition due to potential inhalation and/or due to potential flammability of such airborne particles. The methods disclosed herein may also be utilized to treat particles having size ranges of 0.5 mm or higher. In certain characterizations, the median size of the metallic particles that are treated according to the present disclosure is not greater than about 500 μm, such as not greater than about 200 μm, such as not greater than about 100 μm, such as not greater than about 75 μm, and even not greater than about 50 μm. In another characterization, the median size of the metallic particles is at least about 1 μm, such as at least about 5 μm.

The objects that are subject to the treatment methods disclosed herein may be very highly contaminated with such metallic particles, particularly with metallic lead particles. In one characterization, the concentration of metallic particles on the object (i.e., as a weight percent of the object) is at least about 0.1 wt. %, such as at least about 0.2 wt. %, such as at least about 0.5 wt. %, such as at least about 1 wt. %. Such concentrations of metallic particles might be found, for example, in the crumb rubber, the floor covering, the acoustic tiles, etc. recovered from a firing range. Even higher concentrations of the metallic particles may be present on certain objects such as filters that are utilized to remove the metallic particles from the atmosphere. For example, the concentration of metallic particles on such objects may be at least about 5 wt. %, such as at least about 10 wt. %, at least about 15 weight %, at least about 20 wt. %, at least about 25 wt. %, at least about 30 wt. %, at least about 40 wt. %, or even at least about 50 wt. %. The methods disclosed herein may be utilized to successfully treat such highly contaminated objects, e.g., to render them safe for disposal and/or transportation to a facility such as a recycling facility.

In accordance with the present disclosure, the metallic particles are deposited on the surface of the object as discrete particles. That is, the particles are contaminant particles that are deposited onto the object, such as during the intended use of the object, as opposed to metallic particles that are formed with and/or integral to the object.

In some instances, particularly for very highly contaminated objects such as filters from ventilation systems, it may be desirable to remove a portion of the metallic particles from the object before treatment with the stabilizing composition, e.g., to remove relatively loose metallic particles from the object. For example, the method may include removing a portion of the metallic particles from the object before application of a stabilizing composition, e.g., by releasing the metallic particles and collecting the released metallic particles in a container. In one example, the object may be agitated to release a portion of the metallic particles from the object. Further, a portion of the metallic particles may be removed by vacuuming the object, e.g. using a HEPA vacuum that includes a HEPA filter element (e.g., bag) for capturing the metallic particles.

The methods disclosed herein may be utilized to reduce the availability of the metallic particles, particularly heavy metal particles, e.g., to reduce leachability and/or bioaccessibility and/or airborne contamination. In certain characterizations, the methods may be effective for meeting or exceeding regulatory testing for the availability of the metallic particles. In one such characterization, the treated object (s) are capable of passing stringent RCRA (Resource Conservation and Recovery Act) testing criteria, including TCLP (Toxicity Characteristic Leaching Procedure), SPLP (Synthetic Precipitation Leaching Procedure) and/or STLC (Soluble Threshold Limit Concentration). Under the RCRA, solid wastes are considered hazardous and are subject to stringent disposal regulations if the waste leaches excessive heavy metals under the TCLP set forth in the Federal Register, Vol. 55, No. 126, pp. 26985 to 26998. The current RCRA threshold value for the classification of a waste as hazardous for lead is a TCLP value of 5.0 parts per million (ppm) or greater.

As is discussed above, the stabilizing composition includes a heavy metal stabilizing agent. The heavy metal stabilizing agent may include a compound, or a precursor to a compound, that is capable of reacting with the metallic particles to reduce the leachability and/or bioaccessibility of the metal. In certain embodiments, the stabilizing agent is selected from the group consisting of a phosphate compound, a silicate compound, a carbonate compound, a sulfide compound, and a hydroxide compound. Combinations of these compounds may also be utilized.

For example, the heavy metal stabilizing agent may include a hydroxide compound such as magnesium hydroxide ($Mg(OH)_2$) and/or a precursor to magnesium hydroxide, such as magnesium oxide (MgO). In one characterization, the stabilizing composition may include at least about 0.1 wt. % of a hydroxide compound or a precursor to a hydroxide compound. In another characterization, the stabilizing composition may include not greater than about 10 wt. % of a hydroxide compound or a precursor to a hydroxide compound. In one particular characterization, the heavy metal stabilizing agent includes both a hydroxide compound and an oxide compound that is a precursor to a hydroxide compound, such as in a ratio of about 1:1, e.g., from about 0.8:1 to about 1.2:1. Other useful hydroxide compounds include calcium hydroxide ($Ca(OH)_2$) which may be provided as calcium hydroxide or a precursor to calcium hydroxide such as calcium oxide, sodium hydroxide (NaOH) or a precursor to sodium hydroxide, and potassium hydroxide or a precursor to potassium hydroxide.

In another characterization, the heavy metal stabilizing agent includes a phosphate compound. The phosphate compound may be a substantially insoluble phosphate compound, e.g., where the phosphate compound forms a slurry with the liquid carrier. In another characterization, the phosphate compound may be a substantially soluble phosphate compound where the phosphate compound wholly or partially forms a solution with the liquid carrier. Although not limited to any particular phosphate compound, the phosphate compound may be selected from the group consisting of tricalcium phosphate, dicalcium phosphate, monocalcium phosphate, dimagnesium phosphate, monomagnesium phosphate, disodium phosphate, disodium pyrophosphate, trisodium phosphate, trimagnesium phosphate, monopotassium phosphate, ammonium dihydrogen phosphate, diammonium phosphate, monosodium phosphate, tripotassium phosphate, dipotassium phosphate, single superphosphate, triple superphosphate, phosphoric acid, and combinations thereof. These compounds also encompass their hydrated forms, e.g., the use of the term disodium phosphate includes the hydroxylated form disodium phosphate heptahydrate, the use of the term trisodium phosphate includes the hydroxylated form trisodium hexahydrate, etc.

The concentration of the heavy metal stabilizing agent in the stabilizing composition should be sufficient to ensure that the metallic particles of interest, such as metallic lead particles, are sufficiently treated by the agent so that the treated object is rendered safe for transportation and/or disposal of the object. In one characterization, the stabilizing composition includes at least about 10 wt. % of the heavy metal stabilizing agent. In further characterizations, the stabilizing composition may include at least about 20 wt. % of the heavy metal stabilizing agent, such as at least about 25 wt. %, such as at least about 30 wt. %, such as at least about 35 wt. %, such as at least about 40 wt. % and even at least about 45 wt. % of the heavy metal stabilizing agent. Typically, the stabilizing composition will include not greater than about 70 wt. % of the heavy metal stabilizing agent, such as not greater than about 60 wt. % of the heavy metal stabilizing agent.

The liquid carrier may comprise a variety of liquids, e.g., aqueous-based liquids that comprise water. In one characterization, the liquid carrier consists essentially of water. Table I lists several phosphate compounds that are useful as heavy metal stabilizing agents and that have a relatively high solubility in water, e.g., where the phosphate compound may completely or at least partially dissolved within a liquid carrier.

TABLE I

| Compound | Formula | Solubility in Water (g/100 mL) |
|---|---|---|
| Phosphoric Acid | $H_3PO_4$ | 392 |
| Dipotassium phosphate | $K_2HPO_4$ | 149 |
| Tripotassium phosphate | $K_3PO_4$ | 90 |
| Monosodium phosphate | $NaH_2PO_4$ | 60 |
| Diammonium phosphate | $(NH_4)_2H(PO_4)$ | 58 |
| Ammonium dihydrogen phosphate | $NH_4H_2PO_4$ | 40 |
| Monopotassium phosphate | $KH_2PO_4$ | 23 |
| Trimagnesium phosphate | $Mg_3(PO_4)_2$ | 23 |
| Trisodium phosphate | $Na_3PO_4$ | 12 |
| Disodium pyrophosphate | $Na_2H_2P_2O_7$ | 12 |
| Disodium phosphate heptahydrate | $Na_2HPO_4 \cdot 7H_2O$ | 12 |

Table II lists several phosphate compounds that have a relatively low solubility in water, e.g., where the phosphate compound may form a slurry with the liquid carrier having little or no phosphate solubilized in the liquid carrier.

TABLE II

| Compound | Formula | Solubility in Water (g/100 mL) |
|---|---|---|
| Disodium phosphate | $Na_2HPO_4$ | 7.7 |
| Dimagnesium phosphate | $MgHPO_4$ | 5.83 |
| Monocalcium phosphate[1] | $Ca(H_2PO_4)_2$ | 2.0 |
| Dicalcium phosphate | $CaHPO_4$ | 0.02 |
| Tricalcium phosphate | $Ca_3(PO_4)_2$ | 0.002 |
| Monomagnesium phosphate | $Mg(H_2PO_4)_2$ | (Slightly soluble) |
| Trimagnesium phosphate | $Mg_3(PO_4)_2$ | (Essentially Insoluble) |

[1]Also known as superphosphate.

Thus, in certain embodiments, the heavy metal stabilizing agent may be selected from one or more of the compounds listed in Table I such that the heavy metal stabilizing agent is at least partially solubilized in the liquid carrier, e.g., is at least partially solubilized to form an aqueous solution of the heavy metal stabilizing agent. In certain characterizations, the heavy metal stabilizing agent has a solubility in the liquid carrier of at least about 10 g/100 mL, such as at least about 50 g/100 mL, or even at least about 100 g/100 mL. Characterized another way, in some embodiments at least about 80 wt. % of the heavy metal stabilizing agent may be solubilized in the liquid carrier, such as at least about 90 wt. %, at least about 95 wt. %, or even at least about 98 wt. % of the heavy metal stabilizing agent may be solubilized in the liquid carrier. In certain characterizations, the heavy metal stabilizing agent may comprise dipotassium phosphate due to its high solubility. The stabilizing composition including high solubility compound(s) such as dipotassium phosphate may also be acidified using an acid, e.g. an inorganic acid such as hydrochloric acid (HCl), sulfuric acid ($H_2SO_4$) and/or phosphoric acid ($H_3PO_4$).

In other embodiments, the stabilizing composition may comprise a slurry of the liquid carrier and particulates of the heavy metal stabilizing agent dispersed in the liquid carrier, such as when one or more of the compounds listed in Table II is utilized in the stabilizing composition. For example, to form such a slurry, the heavy metal stabilizing agent may be selected from the group consisting of disodium phosphate, dimagnesium phosphate, monocalcium phosphate, dicalcium phosphate, tricalcium phosphate, monomagnesium phosphate, trimagnesium phosphate, and combinations thereof.

In one particular characterization, the heavy metal stabilizing agent includes at least a first heavy metal stabilizing agent and a second heavy metal stabilizing agent. For example, the first heavy metal stabilizing agent may be dipotassium phosphate and the second heavy metal stabilizing agent may be phosphoric acid. Other combinations of the foregoing heavy metal stabilizing agents may advantageously be utilized. For example, in one characterization, the heavy metal stabilizing agent includes at least a phosphate compound and magnesium hydroxide and/or a magnesium hydroxide precursor. In another characterization, the first heavy metal stabilizing agent may have a solubility in the liquid carrier of at least about 10 g/100 mL and the second heavy metal stabilizing agent may have a solubility in the liquid carrier of not greater than about 10 g/100 mL. In this manner, the stabilizing composition may include one heavy metal stabilizing agent that is at least partially soluble in the liquid carrier and another heavy metal stabilizing agent that is substantially insoluble in the liquid carrier.

The stabilizing composition may be applied to the object in a variety of ways. In one embodiment, the stabilizing composition is applied to the object by spraying the stabilizing composition onto the object. In another embodiment, the stabilizing composition is applied to the object by immersing the object in the stabilizing composition. The immersion of the object may also include agitating the object relative to the stabilizing composition (e.g., by agitating the object, the stabilizing composition, or both) to facilitate contact of the stabilizing composition with the entire surface of the object.

For some applications, it may be desirable to also use a fixation agent to further stabilize the metallic particles relative to the object that is being treated. Stated another way, a fixation agent may advantageously facilitate the adherence of the contaminant particles to the object, and/or of the stabilizing agent to the contaminant metallic particles and to the object. Thus, in certain embodiments, the method also includes the application of a fixation agent to the object.

The fixation agent may be applied to the object in any manner and at any time, e.g., in relation to the stabilizing composition. For example, the fixation agent may be applied to the object after the step of applying the stabilizing composition is completed. Alternatively, or in addition to such an application, the stabilizing composition and the fixation compound may be applied to the object substantially simultaneously, such as where the stabilizing composition and the fixation agent are combined before being applied to the object.

The fixation agent may be organic or inorganic, natural or synthetic. The fixation agent may be broadly characterized as being selected from an adhesive, a binder, a resin, a thickener, an elastomeric polymer, waxes, paints (e.g., water/latex and oil based paints), polyaspartic compounds/coatings, polyurethanes (e.g., water-based or oil-based), varnish, shellac, lacquer, a cementitious material and combinations thereof.

Thus, in one embodiment, the fixation agent may be classified as an adhesive. Broadly characterized, an adhesive is a material that binds objects together and resists their separation when the material is applied to the surface of one or more of the objects, e.g., of the metallic particles. The adhesive may or may not require further processing (e.g., the application of heat or a chemical agent) after being contacted with the metallic particles being agglomerated. Examples of adhesives include, but are not limited to, materials commonly referred to as a glue, cement or paste.

One example of an adhesive is a common glue. Common glues may be formed from gelatinous proteins (gelatin), e.g., formed by the hydrolysis of collagen obtained from animal tissue. Synthetic glues may comprise polyvinyl acetate (PVA) or similar polymers, and examples include common wood glue, white glue and the like.

Another type of adhesive is a cementitious material. Examples of cementitious materials include plaster (e.g., gypsum plaster, lime plaster, cement plaster), non-hydraulic cements, hydraulic cements such as Portland cement, and the like.

Another type of adhesive is a paste, which is similar to a glue. A paste is a viscous (thick) fluidic material that is a mixture of a powder and a liquid. Examples include wheat paste, made from wheat flour or starch and water, and pastes commonly referred to as wallpaper pastes or wallpaper adhesives. Such wallpaper pastes may include cellulosic materials such as methyl cellulose and/or starch, including modified starches such as dextrin, and the like.

Other examples of useful fixation agents include certain compounds referred to as binders, including inorganic binders or organic binders. Examples of useful inorganic binders include sodium silicates, magnesium aluminum silicates and bentonite (e.g., montmorillonite). Examples of organic binders include polyvinyl alcohol (PVA), starches, carboxymethylcellulose, dextrin, wax emulsions, polyethylene glycols (PEG), lignosulfonates, methylcellulose paraffins, polyacrylates and the like.

Other useful fixation agents include resins. A resin is a viscous liquid that is either naturally produced by plants or is synthesized. In certain characterizations, these viscous liquids can be hardened when treated with chemicals. Resins may also include some non-volatile solid substances in small amounts, which are responsible for making the resin thick and sticky. Synthetic resins include, but are not limited to, epoxy resins (i.e., epoxy adhesives), which may include polyurethane resins, acrylic resins, cyanoacrylate resins, polyvinyl alcohol (PVA) resins and other chemistries, including elastomer modified epoxy resins.

One example of a class of adhesive resins are certain polysaccharides, such as natural or processed gums, e.g., xanthan gum, guar gum, locust bean gum, diutan gum, welan gum and the like.

The fixation agent may be a compound that is sometimes referred to as a thickening agent or thickener, e.g., a compound that is capable of increasing the viscosity of a liquid (e.g., water) without substantially changing other properties of the liquid. Examples of thickeners include gelling agents such as natural or processed gums, starches, gelatin and the like. Other examples include polyethylene glycol (PEG), polyacrylic acid, waxes such as paraffin wax and the like. Other suitable examples of thickeners include polyurethanes, acrylic polymers, latex such as acrylic latex, styrene/butadiene, polyvinyl alcohol (PVA), clays such as attapulgite, bentonite and other montmorillonite clays, cellulosics such as carboxymethylcellulose (CMC), hydroxymethylcellulose (HMC), and hydroxypropyl methylcellulose (HPMC), sulfonates such as sodium or calcium salts, saccharides such as carrageenan, pullulan, konjac and alginates, proteins such as casein, collagen and albumin, modified castor oil, and organosilicones such as silicone resins.

In yet a further embodiment, the fixation agent comprises an elastomeric polymer. For example, the fixation agent may comprise an elastomeric polymer selected from the group consisting of ethylene vinyl acetate (EVA), poly(ethylene vinyl acetate) (PEVA), and the like.

Other useful fixation agents may include waxes such as tacky wax and spray-on wax, paints (e.g., water/latex and oil based paints), polyaspartic compounds/coatings, polyurethanes (e.g., water-based or oil-based), varnish, shellac, lacquer, a cementitious material and the like.

It will be appreciated that many of the foregoing fixation agents may be applied to the object in a liquid or otherwise flowable form, e.g., where the fixation agent is dispersed in a solvent and/or a liquid such as water.

The concentration of fixation agent that is most useful, e.g., relative to the stabilizing composition, will depend on a variety of factors, including the nature of the object being treated. In one characterization, the stabilizing composition comprises at least about 0.1 wt. % of the fixation agent, such as at least about 1 wt. % of the fixation agent, such as at least about 5 wt. % of the fixation agent. In another characterization, the stabilizing composition comprises not greater than about 50 wt. % of the fixation agent, such as not greater than about 40 wt. % of the fixation agent, such as not greater than about 25 wt. % of the fixation agent, or even not greater than about 15 wt. % of the fixation agent.

In one particular characterization, the utilization of a stabilizing composition having at least about 5 wt. % and not greater than about 50 wt. % of a fixation agent, e.g., a resin binder, may enable the stabilizing composition to "stick" to an object for a period of time sufficient to enable the heavy metal stabilizing agent to react with the metallic heavy metal particles.

In addition to functioning as a fixation agent, certain compounds may also act as a wetting agent that facilitates the treatment of very fine and hydrophobic metallic particles, such as lead particles. Such hydrophobic particles are difficult to effectively wet in aqueous mediums, such as a water-based liquid carrier. Due to the particles having a very small particle size and being very compact along with the hydrophobic nature of the particles themselves, a wetting agent is needed to effectively coat the particles evenly with the aqueous medium to facilitate treatment. For example, using a mixture of a gum (e.g., xanthan gum) and water, the lead particles are wetted much more readily, and the treatment will disperse more evenly onto the particles.

A variety of other additives may be applied to the object, e.g., in combination with the stabilizing composition and/or the fixation agent, or separately applied to the object. One particular example is a fire retardant. The fire retardant may be a passive fire retardant or an active fire retardant. Examples of useful fire retardants include ammonium phosphate compounds. Mineral fillers such as hydroxides or oxides (e.g., aluminum hydroxide, aluminum oxide, magnesium hydroxide, magnesium oxide, zinc oxide, etc.) may also be useful as fire retardants. Carbonate compounds may also be utilized. For example, an intumescent paint may be utilized to seal the stabilizing composition to the object and add fire retardant properties to the treated object. The use of a fire retardant may be particularly advantageous when the object includes a potentially explosive dry powder (e.g., gunpowder), such as when the object has been obtained from a firing range.

Other additives may include, for example: preservatives such as biocides, bactericides, fungicides and algaecides; solvents; co-solvents; defoamers; surfactants; wetting agents; anti-freezing agents (e.g., propylene glycol); tint/colorant; scents; bitterants; etc.

The foregoing method may be utilized to treat an object that has been removed from its place of use, such as after it has been removed from an indoor firing range. Alternatively, the methodology may be applied to objects that are treated "in place" without being removed from its place of use. Advantageously, if the object is treated in place it may not be necessary to comply with certain environmental standards such as the Resource Conservation and Recovery Act (RCRA) or Universal Treatment Standards (UTS).

The object may include a 3-dimensional surface that is contaminated with the metallic particles, e.g. objects that have a meaningful depth in addition to planar dimensions. The methods may be particularly useful for the treatment of filters, particularly filters that are utilized to remove metallic particles (e.g., dust) from the atmosphere. Such filters may include HEPA filters, i.e. a filter that is configured to remove at least about 99.97% of airborne particles having a size of 0.3 μm. The filter may also be a non-HEPA filter, such as a non-HEPA filter that is configured to retain at least about 60% of airborne particles having a size of 20 μm. Such non-HEPA filters are commonly used as pre-filters in ventilation systems that are implemented in indoor firing ranges and similar facilities. HEPA and non-HEPA filters may have virtually any configuration such as a planar filter or cartridge filter, and the filtering material may be pleated or non-pleated. In addition, the filtering material may be a porous filtering material selected from cellulosic materials, cloth materials and metallic materials. In some embodiments, the filters may be subjected to a pressure differential across the filter during the step of applying the stabilizing composition to the filter to enhance the penetration of the stabilizing composition into the filtering material.

The object may also include granulated rubber, e.g., crumb rubber that is recovered from a "bullet trap" that is commonly used to reduce the velocity and capture projectiles fired towards a target in a firing range. The object may also be acoustic insulation, which is commonly used in indoor firing ranges to reduce the noise level for its users. Other objects recovered from such environments as indoor firing ranges may also be treated in accordance with this embodiment, such as floor coverings (e.g., carpet or carpet padding), and the like.

In addition to firing ranges, the object may be obtained from recycling facilities, such as recycling facilities that recycle batteries, cathode ray tubes (e.g., CRT glass) or other lead-containing objects. In the case of CRT glass, the lead may be in the form of a lead-containing silicate compound. Although these particles are not metallic particles, they are also highly toxic and the methods disclosed herein are applicable to such lead-containing particles. The methods may also be utilized to treat objects that obtained from other industrial processing facilities, manufacturing facilities, or objects retrieved from the uncontrolled release or spill to the environment.

In yet another embodiment of the present disclosure, a method for the stabilization of substantially free-flowing (e.g., loose) metallic particles of a heavy metal is provided. Although not limited thereto, the free-flowing heavy metal particles may be derived, in whole or in part, from the treatment methods described above such as when an object is agitated or otherwise manipulated to remove loose metallic particles from the object. However, free-flowing metallic particles of a heavy metal may also be obtained from other sources, and the present disclosure is not limited to any particular source of the heavy metal particles.

In accordance with this embodiment, the method includes contacting the free-flowing metallic particles with an agglomeration agent to substantially agglomerate at least a portion of the metallic particles and form metallic particle agglomerates (e.g., form at least a first metallic particle agglomerate) and to reduce the probability of the metallic particles being released to the surrounding environment (e.g., the atmosphere) during handling and/or transportation of the metallic particles.

The agglomeration agent for this method may be selected from the list of fixation agents described above with respect to the treatment of objects having heavy metal particle contamination. Particularly useful agglomeration agents may include natural resins, including gums, such as a gum selected from the group consisting of xanthan gum, guar gum, locust bean gum, diutan gum and welan gum.

As is discussed in the embodiment described above using a fixation agent, in addition to functioning as an agglomeration agent, certain compounds may also act as a wetting agent that facilitates the treatment of very fine and hydrophobic metallic particles, such as lead particles. Such hydrophobic particles are difficult to effectively wet in aqueous mediums, such as a water-based liquid carrier. Due to the particles having a very small particle size and being very compact along with the hydrophobic nature of the particles themselves, a wetting agent is needed to effectively coat the particles evenly with the aqueous medium to facilitate treatment. For example, using a mixture of a gum (e.g., xanthan gum) and water, the lead particles are wetted much more readily, and the treatment will disperse more evenly onto the particles. The xanthan gum also allows for the metallic particles to be more easily agglomerated using a reduced amount of the liquid carrier.

The agglomerate formed by this method will include at least the metallic particles and the agglomeration agent. For example, the agglomerates may include at least about 0.05 wt. % of the agglomeration agent, such as at least about 0.1 wt. % of the agglomeration agent, such as at least about 0.5 wt. % of the agglomeration agent. In another characterization, the agglomerates may include not greater than about 15 wt. % of the agglomeration agent, such as not greater than about 10 wt. % of the agglomeration agent or even not greater than about 8 wt. % of the agglomeration agent. However, the amount of agglomeration agent utilized may be adjusted depending on the nature of the metallic particles.

As is described above with respect to other embodiments of this disclosure, the metallic particles may include a variety of metallic particles including, but not limited to, metallic lead particles, metallic copper particles, metallic arsenic particles, and metallic antimony particles. This treatment method is not limited to the treatment of any particular type of metallic particles and may be utilized to treat (e.g., agglomerate) any type of particles, metallic or non-metallic.

The metallic particles may be contacted (e.g., combined) with the agglomeration agent by a variety of methods. For example, an agglomeration agent in a substantially dry form (e.g., a powder) may be mixed with the metallic particles. Thereafter, a solvent (e.g., for the agglomeration agent) may be added to the mixture of the dry agglomeration agent and the metallic particles. For example, the solvent may be water or an otherwise aqueous-based liquid such as a mild acidic or basic solution. Alternatively, or in addition to, the agglomeration agent may be mixed with a solvent before being contacted with the metallic particles.

In addition to the agglomeration agent, when the metallic particles include heavy metals such as metallic lead particles, a heavy metal stabilizing agent such as those described above may also be applied to the metallic particles with the agglomeration agent (e.g., substantially simultaneously), or before the agglomeration agent is contacted with the metallic particles. The heavy metal stabilizing agent may be selected from those described above, and may be applied to the metallic particles in the form of a stabilizing composition such as the stabilizing compositions described above and/or recited in the claims. While not being limited to any particular concentration, the weight ratio of the heavy metal stabilizing agent to the metallic particles is at least about 0.5:1, such as at least about, such as at least about 2:1, or even at least about 3:1. Further, the weight ratio of the agglomeration agent to the heavy metal stabilizing agent may be at least about 0.005:1, such as at least about 0.01:1, such as at least about 0.1:1, or even at least about 0.15:1.

Using a combination of an agglomeration agent and a heavy metal stabilizing agent may advantageously enable a reduction in leachability of metallic lead particles to meet regulations for non-hazardous disposal, such as the Universal Treatment Standards (UTS) set forth at 40 CFR § 268.48. In one characterization, the leachability of the lead (non-wastewater) is reduced to not greater than 7.5 mg/L as measured by the toxicity characteristic leaching procedure (TCLP), and in another characterization may have a leachability of not greater than 5 mg/L to meet RCRA requirements set forth at 40 CFR § 261.24.

Although the term agglomerate is utilized to describe the product resulting from the foregoing method, it will be appreciated that the method may be utilized to form a relatively large unitary article, particularly when a relatively large amount of agglomeration agent is applied to the metallic particles. More commonly, the method will result in the formation of agglomerates, e.g., a small cluster comprising the agglomeration agent and the metallic particles. Although not limited to any particular size, these agglomerates will have a size that is larger than the individual metallic particles. For example, the agglomerates may have a median (D50) size (e.g., diameter) of at least about 100 µm, such as at least about 1 mm, and even at least about 1 cm.

It is often desirable to recycle collected metallic lead particles, e.g., by melting the lead particles. However, the lead particles may combust when the particles are fed to a furnace or exposed to a spark, e.g., friction or generated by an electrical source. In accordance with any of the foregoing embodiments, it may be desirable to also apply a fire retardant to the metallic particles to reduce the possibility of such combustion. Thus, in one example, the method includes the addition of a fire retardant to the agglomerated metallic particles such as by combining a fire retardant with the agglomeration agent and/or by applying a fire retardant to the agglomerated particles. The fire retardant may be selected from those disclosed in detail above. The use of a fire retardant may be particularly useful when the metallic particles comprise a potentially explosive dry powder (e.g., gunpowder), such as when the metallic particles are recovered from a firing range.

In certain embodiments described above, a device such as a vacuum may be utilized to collect metallic particles, e.g., metallic lead particles. In this regard, the loose portion of metallic particles may be vacuumed using a vacuum device that includes a HEPA filter bag, where the HEPA filter bag is preloaded with a stabilizing agent and/or with an agglomeration agent such as those described above. When the HEPA filter bag is preloaded with an agglomeration agent and/or a stabilizing agent, a solvent such as water may be added to the HEPA bag after collection of the metallic particles to form and agglomerated mass comprising the metallic particles. Alternatively, or in addition to, one or more of the stabilizing agent and agglomeration agent may be added, e.g., in dry form or with a liquid carrier, to the HEPA filter bag after collection of the metallic particles.

FIGS. 1-5 illustrate various examples of process flows in accordance with the above description. FIGS. 1-5 are presented for the purposes of illustration, and are not intended to limit the present disclosure to any particular aspects illustrated therein.

FIG. 1 illustrates a process 100 for the treatment of a filter 102 that includes metallic lead particles, e.g., lead dust, deposited on a surface of the filter 102. The filter 102 may be categorized 104 as a pre-filter 106 (e.g., non-HEPA) or as a HEPA filter 114. If the filter 102 is categorized as a HEPA filter 114, a portion of the lead dust may be optionally removed 116 from the HEPA filter 114. After the optional removal 116 of lead dust, the HEPA filter may be treated 118a/118b with a phosphate solution, i.e., with a phosphate compound that is partially or fully dissolved in a liquid carrier. By treating 118a/118b the HEPA filter 114 with a phosphate solution, the solubilized phosphate will be able to contact the lead dust that is captured within the very fine pores of the HEPA filter 114.

Thereafter, a fixation agent 120a may be contacted with the treated HEPA filter 114. As is discussed above, in an alternative embodiment, the phosphate solution and the fixation agent (e.g., a gum) may be applied to the HEPA filter 114 simultaneously to enhance the wetting of the lead particles by the phosphate solution, in addition to adhering the phosphate to the filter 114. A TCLP test 122 may be performed to determine if the total leachable lead is less than about 5 ppm. If the treated HEPA filter passes the TCLP test 122, the treated filter may be disposed 124 in a non-hazardous waste landfill. If the treated filter does not pass the TCLP test 122, the treated filter may be disposed 126 in a hazardous waste landfill, or may be recycled 128.

In a similar manner, a pre-filter 106 may optionally have lead particles (e.g., loose lead dust) removed 108. The pre-filter 106 may be treated with a phosphate slurry and/or with a phosphate solution 110a/110b. That is, a pre-filter 106 may be amenable to treatment using a phosphate slurry, particularly if the phosphate slurry includes phosphate particles of a relatively fine particle size. Thereafter, a fixation agent may be added 112a/112b to the treated pre-filter. Thereafter, a TCLP test 122 may be performed to determine if the total leachable lead is less than about 5 ppm. If the treated pre-filter passes the TCLP test 122, the treated filter may be disposed 124 in a non-hazardous waste landfill. If the treated filter does not pass the TCLP test 122, the treated filter may be disposed 126 in a hazardous waste landfill, or may be recycled 128.

Figure 2:
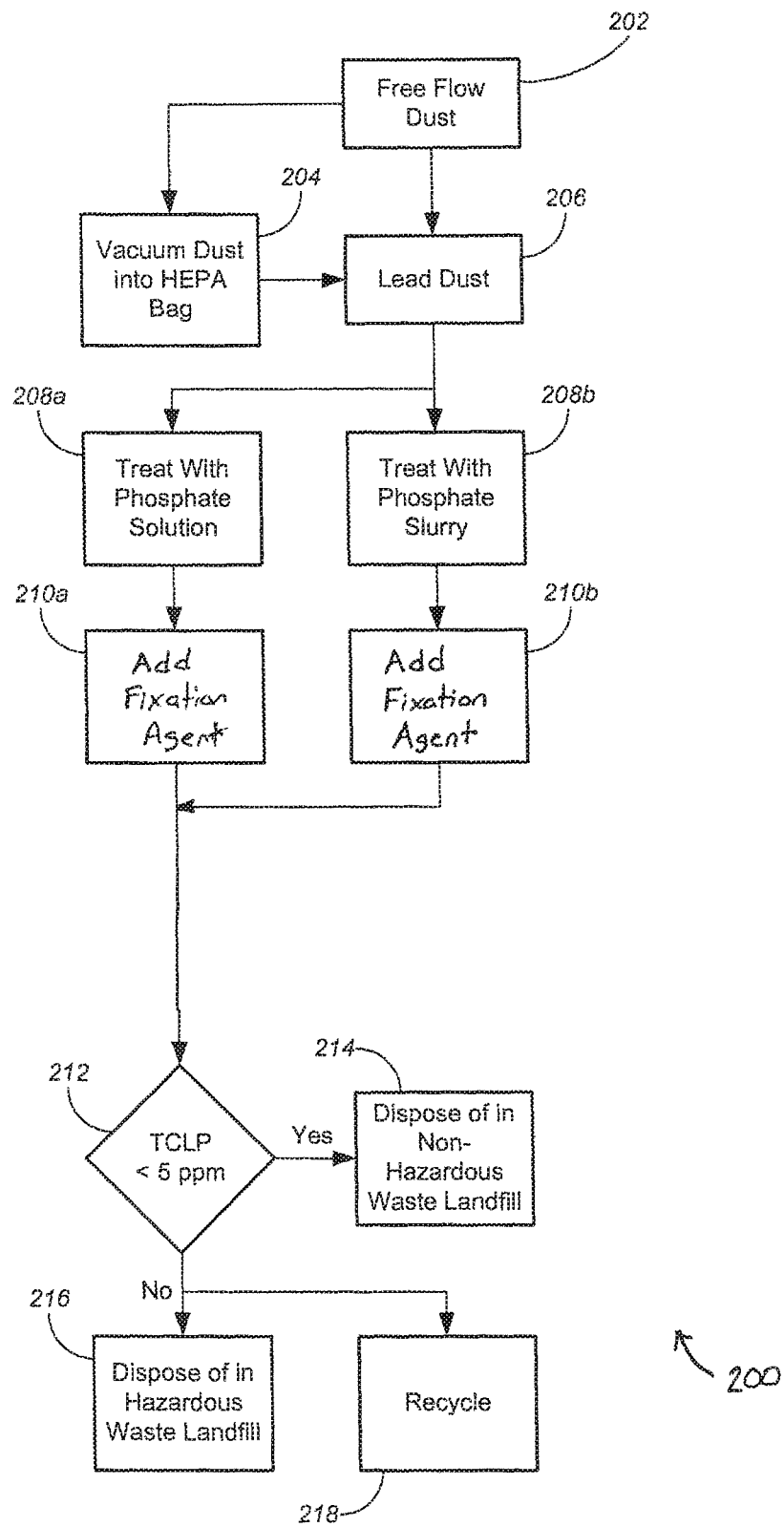
FIG. 2 is a flowsheet illustrating a process for the metallic particles according to an embodiment.

FIG. 2 illustrates a process 200 for the treatment of metallic particles, e.g., free-flowing metallic particles (e.g., lead dust) in accordance with an embodiment. The free flowing lead dust 202 may be dust that is physically removed, e.g., vacuumed 204 from an object into HEPA filter bag. The lead dust 206 may be treated with a stabilizing composition, e.g., a phosphate solution 208a and/or a phosphate slurry 208b to render at least a portion of the lead dust as non-leachable. Thereafter, the lead dust that is been treated with the stabilizing composition may be contacted with an agglomeration agent 210a/210b, e.g., with an agglomeration agent, to form agglomerates of the lead dust. Thereafter, a TCLP test may be performed 212 to determine if the total leachable lead from the lead agglomerates is less than about 5 ppm. If the lead agglomerates pass the TCLP test 212, the lead agglomerates may be disposed 214 in a non-hazardous waste landfill. If the treated lead dust agglomerates do not pass the TCLP test 212, the agglomerated lead dust may be disposed in a hazardous waste landfill 216 or may be recycled 218.

Figure 3:
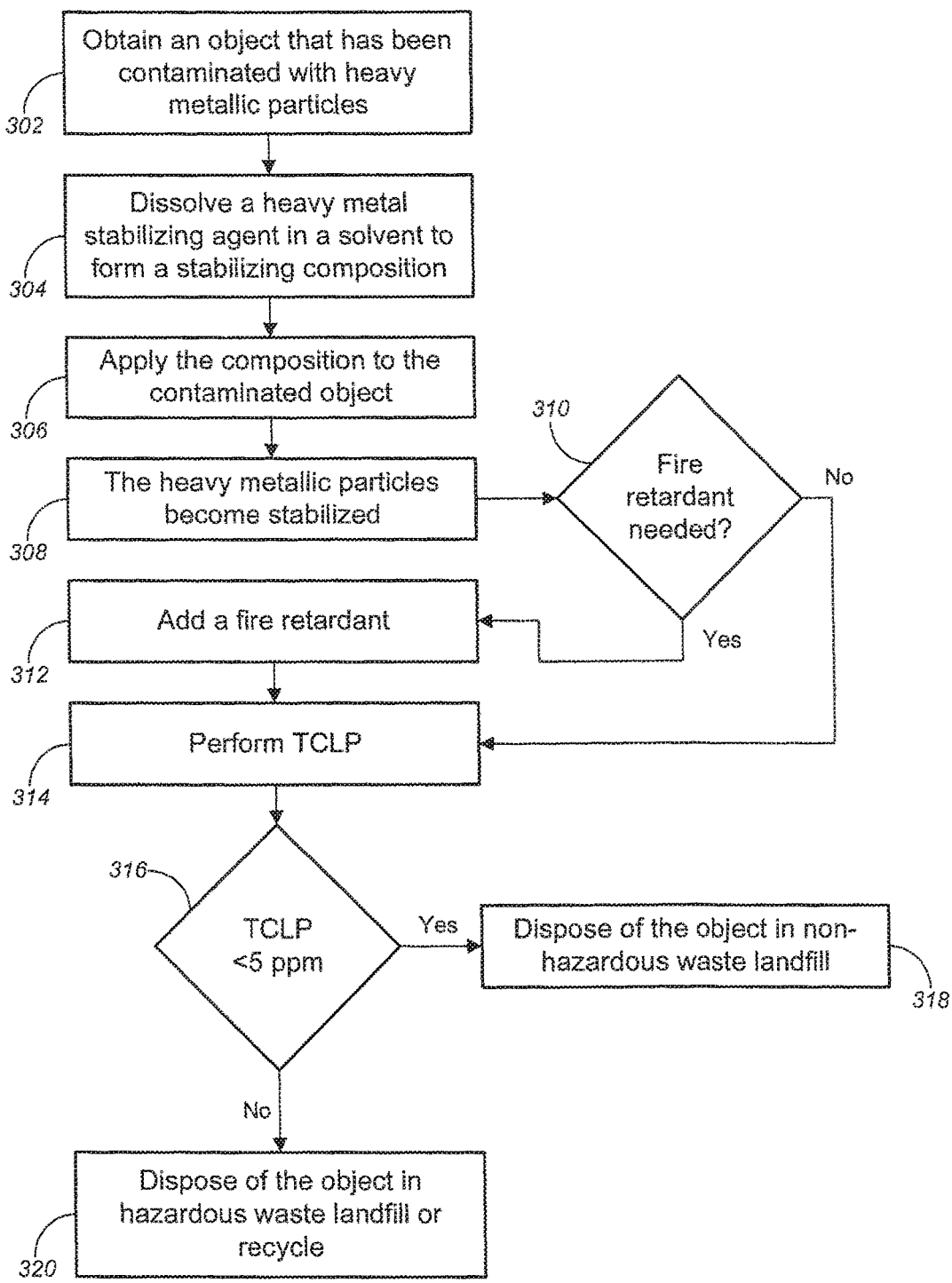
FIG. 3 is a flowsheet illustrating a process for the treatment of an object that is contaminated with heavy metal particles according to an embodiment.

FIG. 3 illustrates another process 300 for the treatment of an object that is contaminated with heavy metal particles on a surface of the object. Once the object is obtained 302, a heavy metal stabilizing agent is dissolved 304 in a solvent to form a stabilizing composition and is applied 306 to the contaminated object to stabilize 308 the heavy metal particles. If a fire retardant is needed 310, e.g., where the object includes small amounts of a potentially explosive material such as gunpowder, then the fire retardant is contacted 312 with the treated object. Thereafter, a TCLP test may be performed 314. If the treated object passes the TCLP test 316 it may be disposed 318 in a non-hazardous waste landfill. If the object does not pass the TCLP test 316, then the object may be disposed in a hazardous waste landfill or may be recycled 320.

Figure 4:
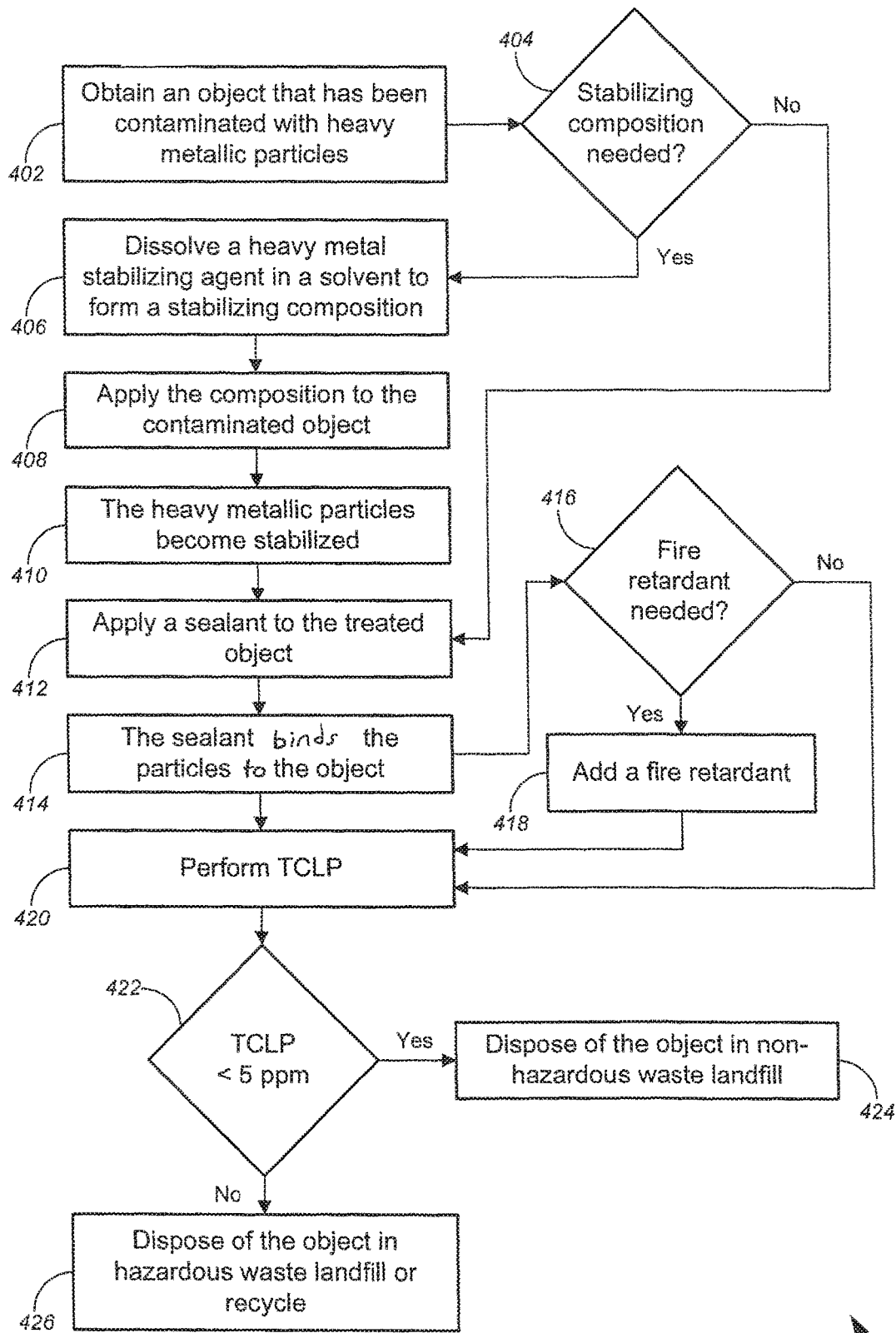
FIG. 4 is a flowsheet illustrating a process for the treatment of an object that is contaminated with heavy metal particles by sealing the object according to an embodiment.

FIG. 4 illustrates a process 400 for the treatment of an object is contaminated with heavy metal particles by sealing the object. The object 402 may or may not require a stabilizing composition 404. If the object does not require a stabilizing composition 404, then the object may be directly treated by applying 412 a sealant (e.g., a fixation agent) to the object. If it is determined that a stabilizing composition 404 is needed to properly treat the object, then a heavy metal stabilizing agent, e.g., that has been dissolved 406 in a solvent to form a stabilizing composition may be applied 408 to the contaminated object to stabilize 410 the heavy metal particles prior to applying 412 a sealant to the treated object. After the sealant has been applied 412 to the object to bind 414 the metallic particles to the object, a fire retardant 418 may optionally be added, such as by coating the treated object with the fire retardant. In either case, a TCLP test may be performed 420 and if the treated object passes the TCLP test 422 the treated object may be disposed 424 in a non-hazardous waste landfill. If the treated object does not pass the TCLP test 422, the object may be disposed 426 in a hazardous waste landfill or may be recycled.

Figure 5:
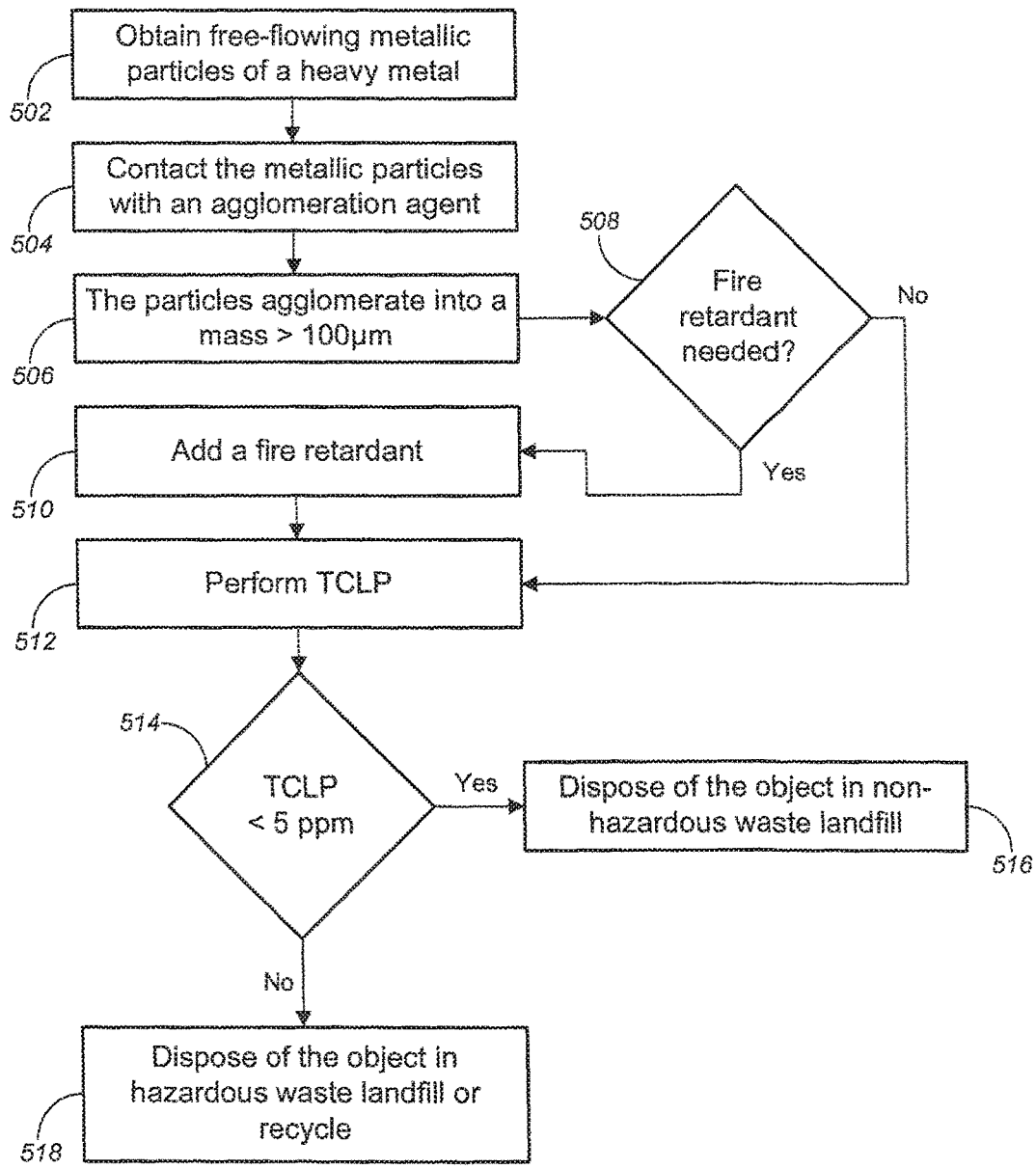
FIG. 5 is a flowsheet illustrating a process for the agglomeration of free-flowing metallic particles according to an embodiment.

FIG. 5 illustrates a process 500 for the agglomeration of free-flowing metallic particles such as free-flowing metallic lead particles. Once the free-flowing metallic particles are obtained 502 they may be contacted with an agglomeration agent 504. The metallic particles may be contacted 504 with the agglomeration agent in a manner to form 506 agglomerates having a size of at least about 100 µm. It may also be determined if a fire retardant is needed 508 and, if so, a fire retardant may be added 510 to the particle agglomerates. Thereafter, a TCLP test may be performed 512. If the agglomerated particles pass the TCLP test 514, the agglomerated particles may be disposed 516 in a non-hazardous waste landfill. If the agglomerated particles do not pass the TCLP test 514 the agglomerated particles may be disposed 518 in a hazardous waste landfill or may be recycled.

EXAMPLES

Firing Range Materials

Several different types of filters are obtained from indoor firing ranges, including box HEPA filters, cylindrical HEPA filters and pre-filters. The box HEPA filters are procured from an air-mover used in an indoor firing range. The cylindrical HEPA filters are procured from a decelerator that is part of a steel trap system in an indoor firing range. The pre-filters are also procured from an indoor firing range.

In addition to the filters, three different types of rubber contaminated with metallic lead particles are obtained from backstop berms acquired from indoor firing ranges. The three types of rubber are granulated rubber, DURA-BLOC rubber (Range Systems, New Hope, Minn., USA) and rubber strips.

In addition, two lead dust samples are also procured from indoor firing ranges. One sample comprises primarily lead dust collected from a dust containment unit (DCU) and the other sample comprises heavily contaminated fine rubber particles from a backstop berm that is collected during range maintenance cleaning.

A copper metal particle sample is also prepared using a 99% reagent grade powder having a median average particle size of less than about 75 µm.

To obtain baseline values for each of these objects, total lead is measured using the EPA's SW486 Method 6010D, which uses Inductively Coupled Plasma-Optical Emissions Spectrometry to detect concentrations of metals. In addition, the samples are analyzed using the EPA's SW846 Method 1311, the Toxicity Leaching Procedure (TCLP). The total lead and TCLP lead baseline values for each material are listed in Table I.

TABLE I

| Section | Type | Total Pb (ppm) | TCLP Pb (ppm) |
|---|---|---|---|
| Filter | Box HEPA | 134,000 | 1620 |
|  | Cylinder HEPA | 247,000 | 5960 |
|  | Pre-Filter | 155,000 | 1519 |
| Rubber | Granulated | 146,000 | 749 |
|  | Strips | 112,000 | 827 |
|  | DURA-BLOC | 216,000 | 1430 |
| Dust | DCU Dust | 967,000 | 8640 |
|  | Rubber Fines | 171,000 | 1310 |

The copper (Cu) particle sample (high purity copper "dust") is also subjected to a TCLP extraction and analyzed for leachable copper. The TCLP Cu value was 8.10 ppm.

Treatment Applying Prior Art Methods

The following prior art methods are selected based on existing, traditional soil remediation and solid hazardous waste treatment methods. These methods are referred to herein as "Conventional Technology." Typically, conventional environmental treatment methods use additives in the range of 2 to 5 wt. % and hazardous waste treatment methods use additives in the 5 to 10 wt. % range. Due to the extremely high concentration of elemental lead in the foregoing objects (Table I), each treatment method is carried out here using about 100 wt. % of the additive. The additives include triple superphosphate (TSP), phosphoric acid ($H_3PO_4$), calcium sulfate ($CaSO_4$), aluminum chloride solution ($AlCl_3$, 0.16 molar), magnesium oxide (MgO), and/or Portland cement. Although the phosphoric acid is initially selected, due to the low pH of below pH 2.0 being classified as hazardous under RCRA, it is eliminated from further consideration, as using a hazardous material to treat a hazard is not suitable for field use. The remaining additives are selected for their known ability to treat soil and hazardous waste contaminated with lead compounds, and the non-hazardous nature of the additives.

The TCLP Pb values using the conventional technology are illustrated in Table II for cylindrical HEPA filters and in Table III for granulated rubber.

TABLE II

| Treatment | Treatment Ratio | TCLP Pb (ppm) |
|---|---|---|
| TSP | 100 wt. % | 2300 |
| TSP + $CaSO_4$ | 100 wt. % | 335 |
| $H_3PO_4$ + $AlCl_3$ | 100 wt. % | 2570 |
| TSP + MgO | 100 wt. % | 1430 |
| Portland Cement | 100 wt. % | 19.4 |

TABLE III

| Treatment | Treatment Ratio | TCLP Pb (ppm) |
| --- | --- | --- |
| TSP + CaSO₄ | 100 wt. % | 990 |
| H₃PO₄ + AlCl₃ | 100 wt. % | 39 |
| TSP + MgO | 100 wt. % | 187 |
| Portland Cement | 100 wt. % | 965 |

Despite the use of a high concentration of additive (i.e., about a 1:1 ratio of additive to metallic particles), all TCLP values listed above are in excess of the RCRA TCLP nonhazardous lead threshold of 5.0 ppm, and also generate 100% more weight than the untreated filter or rubber.

Treatment According to the Present Disclosure

Two different stabilizing compositions according to the present disclosure are used for the treatment of filters and rubber that are heavily contaminated with metallic lead. A first method, referred to herein as a "Spray-On" method, uses a stabilizing composition that comprises suspended solids and a highly adhering resin in a liquid carrier, e.g., in the form of a slurry. Specifically, the Spray-On method includes the use of a combination of monocalcium phosphate, tricalcium phosphate, magnesium hydroxide and magnesium oxide as the heavy metal stabilizing agents, and vinyl acetate ethylene resin (WACKER VINNOL 728, Wacker Chemical Corp., Allentown, Pa.) as the fixation agent. The stabilizing composition comprises 22 wt. % of the heavy metal stabilizing agents and 18 wt. % of the fixation agent, the balance being water. The stabilizing composition is applied to the object by spraying through a spray nozzle.

The second stabilizing composition is a solution of a heavy metal stabilizing agent in water that has a low viscosity to penetrate the pores and folds of a filter, and a resin to promote adherence of the heavy metal stabilizing agent to the object, a method referred to herein as a "Hybrid" method. Specifically, the stabilizing composition comprises about 49 wt. % of phosphoric acid and dipotassium phosphate as the heavy metal stabilizing agents and 12 wt. % of a vinyl acrylic copolymer resin (DSM Haloflex 202, from DSM Coating Resins, B.V., Netherlands) as the fixation agent.

The TCLP Pb values from these experiments are listed in Table IV and Table V. For one experiment with the cylindrical HEPA filter, Portland cement is added post treatment as a drying agent.

TABLE IV

| Filter | Treatment Method | Treatment Ratio | TCLP Pb (ppm) |
| --- | --- | --- | --- |
| Box HEPA Filter | Hybrid | 10 wt. % | 1.09 |
| | Spray On | 10 wt. % | 0.562 |
| | Hybrid + Spray On | 20 wt. % | 0.0817 |
| Cylindrical HEPA Filter | Hybrid | 10 wt. % | 2.29 |
| | Hybrid + Spray On | 20 wt. % | 0.313 |
| | Hybrid + Portland Cement | 15 wt. % | 2.00 |
| Pre-Filter | Hybrid | 20 wt. % | 2.82 |
| | Spray On | 20 wt. % | 0.331 |
| | Hybrid + Spray On | 20 wt. % | 3.14 |

TABLE V

| Rubber | Treatment Method | Treatment Ratio | TCLP Pb (ppm) |
| --- | --- | --- | --- |
| Granulated | Hybrid | 20 wt. % | <0.1 |
| Granulated | Spray On | 20 wt. % | 0.353 |
| Strips | Hybrid | 20 wt. % | 4.94 |
| Strips | Spray On | 20 wt. % | 0.649 |
| DURA-BLOC | Hybrid | 20 wt. % | 1.92 |
| DURA-BLOC | Spray On | 20 wt. % | 0.361 |

All methods successfully reduce the TCLP Pb value to below the RCRA criteria of 5.0 ppm.

Firing Range Lead Dust

In addition to RCRA, lead dust having a particle size of less than 100 µm is classified as hazardous under the Department of Transportation (DOT) classification of scrap metal (22 CCR 66260.10), as well as an Occupational Safety and Health Administration (OSHA) hazard to workers by potentially exceeding the permissible exposure limit (PEL). Not only does the lead dust need to be treated, but the particle size needs to be increased for the material to be rendered non-hazardous for transportation and worker safety. Not only is the lead dust a problem, but also copper dust generated from non-lead bullets or reduced lead bullets that are becoming increasingly popular. For the dust samples, an agglomeration agent was needed that did not affect treatment as well as increased the particle size of the material to greater than about 100 µm.

Several agglomeration and treatment agents according to the present disclosure are tested. The TCLP Pb values for the agglomerated and treated Pb dust samples are listed in Table VI. A pure copper dust sample is also treated, agglomerated, and analyzed for leachability using TCLP.

TABLE VI

| Dust | Treatment Method | Ratio | TCLP Pb (ppm) |
| --- | --- | --- | --- |
| DCU | TSP[1] | 200 wt, % | 26.3 |
| DCU | Hybrid | 500 wt. % | 1.33 |
| DCU | 90 pbw TSP and 10 pbw MgO with 5 pbw Xanthan Gum | 100 wt. % | 0.843 |
| Rubber Fines | 90 pbw TSP and 10 pbw MgO with 5 pbw Xanthan Gum | 10 wt. % | 0.432 |

[1]Prior Art Technique

Following treatment, all lead dust samples are agglomerated into large hardened agglomerates and all TCLP lead values are reduced to below the RCRA criteria of 5.0 ppm. The dust collection unit (DCU) dust included 96.6% lead, therefore higher concentrations of heavy metal stabilizing agent are required. The leachability of the copper dust sample was reduced from 8.10 ppm to 7.04 ppm and the dust was agglomerated.

Methods using current technology for the HEPA filters and other contaminated objects do not successfully treat to the RCRA criteria of 5.0 ppm. In regards to the lead contaminated dust, even if treatment is successful, the material is still considered hazardous due to the small average particle size. HEPA filters and dust contaminated objects are successfully treated to below the RCRA TCLP Pb criteria of 5.0 ppm. In addition, the successfully treatment of lead dust to below RCRA TCLP Pb criteria of 5.0 ppm while increasing particle size to above 100 µm to satisfy the additional DOT requirement.

The conventional technology for treatment of lead-contaminated soils and the like does not successfully apply to firing ranges. Due to the extreme level of contamination from the metallic lead being so much greater, and the matrix being so different than that of soils and typical hazardous lead-contaminated waste, a new method was needed. The present disclosure demonstrates the successful treatment of different types of actual firing range filters and other contaminated objects such as rubber. RCRA TCLP Pb threshold of 5.0 ppm may be achieved. In the case of the lead dust, it may be both treated and agglomerated, and therefore rendered non-hazardous by both RCRA and DOT regulations. Copper powder samples are also agglomerated and the leachability is reduced. Using the treatment methods disclosed herein, firing ranges can significantly reduce the amount of hazardous waste that is generated, provide a safer environment, and allow for ease of transportation, all at a substantial cost savings.

While various embodiments of methods for the treatment of objects that include metallic particles, and for treating metallic particles, have been described in detail, it is apparent that modifications and adaptations of those embodiments will occur to those skilled in the art. However, is to be expressly understood that such modifications and adaptations are within the spirit and scope of the present disclosure.

What is claimed is:

1. A method for the stabilization of substantially free-flowing metallic particles of a heavy metal, comprising the step of contacting the metallic particles with an agglomeration agent to substantially bind together at least a portion of the metallic particles and form at least a first metallic particle agglomerate and reduce the probability of the metallic particles being released to the atmosphere during handling and/or transportation of the metallic particles, wherein the metallic particles comprise metallic lead particles, and wherein the agglomeration agent comprises a natural resin, wherein the agglomeration agent is in a substantially dry form, and the step of contacting the metallic particles with the agglomeration agent comprises mixing the substantially dry agglomeration agent with the metallic particles.

2. The method recited in claim 1, wherein the natural resin is selected from the group consisting of xanthan gum, guar gum, locust bean gum, diutan gum and welan gum.

3. The method recited in claim 1, wherein the metallic particle agglomerate comprises at least about 0.1 wt. % of the agglomeration agent.

4. The method recited in claim 1, wherein the metallic particle agglomerate comprises not greater than about 15 wt. % of the agglomeration agent.

5. The method recited claim 1, wherein the at least a first metallic particle agglomerate comprises not greater than about 10 wt. % of the agglomeration agent.

6. The method recited in claim 1, wherein the metallic particles further comprise metallic particles selected from the group consisting of metallic copper particles, metallic arsenic particles, and metallic antimony particles.

7. The method recited in claim 1, wherein the metallic particles further comprise metallic copper particles.

8. The method recited in claim 1, further comprising the step of adding a solvent to the mixture of the substantially dry agglomeration agent and the metallic particles.

9. The method recited in claim 8, wherein the solvent comprises water.

10. The method recited in claim 9, wherein the solvent consists essentially of water.

11. The method recited in claim 1, further comprising the step of applying a heavy metal stabilizing agent to the metallic particles.

12. The method recited in claim 11, wherein the step of applying the heavy metal stabilizing agent to the metallic particles occurs before the step of contacting the metallic particles with the agglomeration agent.

13. The method recited in claim 11, wherein the method comprises applying the heavy metal stabilizing agent and the agglomeration agent to the metallic particles substantially simultaneously.

14. The method recited in claim 13, wherein the heavy metal stabilizing agent and the agglomeration agent are combined before being applied to the metallic particles.

15. The method recited in claim 11, wherein the heavy metal stabilizing agent is a heavy metal stabilizing agent is selected from the group consisting of a phosphate compound, a silicate compound, a carbonate compound, a sulfide compound, a hydroxide compound and combinations thereof.

16. The method recited in claim 11, wherein the weight ratio of the heavy metal stabilizing agent to the metallic particles is at least about 0.5:1.

17. The method recited in claim 11, wherein the weight ratio of the heavy metal stabilizing agent to the metallic particles is at least about 1.1.

18. The method recited in claim 11, wherein the weight ratio of the heavy metal stabilizing agent to the metallic particles is at least about 2:1.

19. The method recited in claim 11, wherein the weight ratio of the heavy metal stabilizing agent to the metallic particles is at least about 3:1.

20. The method recited in claim 11, wherein the weight ratio of the agglomeration agent to the heavy metal stabilizing agent is at least about 0.005:1.

21. The method recited in claim 11, wherein the weight ratio of the agglomeration agent to the heavy metal stabilizing agent is at least about 0.01:1.

22. The method recited in claim 11, wherein the weight ratio of the agglomeration agent to the heavy metal stabilizing agent is at least about 0.1:1.

23. The method recited in claim 11, wherein the weight ratio of the agglomeration agent to the heavy metal stabilizing agent is at least about 0.15:1.

24. The method recited in claim 1, wherein the metallic particles further comprise a potentially explosive dry powder.

25. The method recited in claim 24, wherein the potentially explosive dry powder comprises gunpowder.

26. The method recited in claim 1, wherein the method comprises the step of applying a fire retardant to the metallic particles.

27. The method recited in claim 26, wherein the agglomeration agent comprises the fire retardant.

28. The method recited in claim 1, wherein the metallic particle agglomerates have an average agglomerate size of at least about 1 mm.

29. A method for the stabilization of substantially free-flowing metallic particles comprising lead particles, comprising the steps of:
    applying a heavy metal stabilizing agent to the metallic particles; and
    after applying the heavy metal stabilizing agent to the metallic particles, contacting the metallic particles with an agglomeration agent to substantially bind together at least a portion of the metallic particles and form at least a first metallic particle agglomerate and reduce the probability of the metallic particles being released to the atmosphere during handling and/or transportation of the metallic particles.

30. The method recited in claim 29, wherein the agglomeration agent is in a substantially dry form, and the step of contacting the metallic particles with the agglomeration agent comprises mixing the substantially dry agglomeration agent with the metallic particles.

31. The method recited in claim 29, wherein the heavy metal stabilizing agent is selected from the group consisting of a phosphate compound, a silicate compound, a carbonate compound, a sulfide compound, a hydroxide compound and combinations thereof.

32. A method for the stabilization of substantially free-flowing metallic particles comprising lead particles and a potentially explosive dry powder, comprising the step of contacting the metallic particles with an agglomeration agent to substantially bind together at least a portion of the metallic particles and form at least a first metallic particle agglomerate and reduce the probability of the metallic particles being released to the atmosphere during handling and/or transportation of the metallic particles, wherein the potentially explosive dry powder comprises gunpowder.

\* \* \* \* \*